(12) United States Patent
Westbrook

(10) Patent No.: US 11,435,737 B2
(45) Date of Patent: Sep. 6, 2022

(54) SYSTEM AND METHOD FOR VARIOUS VEHICLE-RELATED APPLICATIONS

(71) Applicant: Honda Motor Co., Ltd., Tokyo (JP)

(72) Inventor: Shaun K. Westbrook, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 16/418,912

(22) Filed: May 21, 2019

(65) Prior Publication Data

US 2020/0371515 A1  Nov. 26, 2020

(51) Int. Cl.
*G05D 1/00* (2006.01)
*G06F 3/01* (2006.01)

(52) U.S. Cl.
CPC .......... *G05D 1/0016* (2013.01); *G06F 3/015* (2013.01)

(58) Field of Classification Search
CPC . B62K 5/10; B62K 5/08; B62K 5/027; B62K 2204/00; B62D 9/02
See application file for complete search history.

(56) References Cited

U.S. PATENT DOCUMENTS

| | | | |
|---|---|---|---|
| 5,991,675 A * | 11/1999 | Asanuma | B60G 17/0195 701/41 |
| 6,640,923 B1 * | 11/2003 | Dominke | B62D 5/008 180/443 |
| 2011/0006498 A1 * | 1/2011 | Mercier | B62K 5/10 280/124.103 |
| 2013/0053652 A1 | 2/2013 | Cooner | |
| 2015/0272496 A1 * | 10/2015 | Klappert | A61B 5/7278 600/545 |
| 2016/0282940 A1 * | 9/2016 | Hong | G02B 27/0101 |
| 2017/0072840 A1 | 3/2017 | MossadeghPour et al. | |
| 2017/0303852 A1 | 10/2017 | Mu | |
| 2020/0057498 A1 * | 2/2020 | Artemiadis | B25J 13/00 |

FOREIGN PATENT DOCUMENTS

| | | | |
|---|---|---|---|
| CN | 202682737 U | * | 1/2013 |
| CN | 202682737 U | | 1/2013 |
| CN | 107049307 A | | 8/2017 |
| DE | 102015216623 A1 | | 3/2017 |
| JP | 2018082805 A | | 5/2018 |
| WO | 2018096688 A1 | | 5/2018 |

OTHER PUBLICATIONS

CN202682737U-Marchine Translation (Year: 2013).*

* cited by examiner

*Primary Examiner* — Anne Marie Antonucci
*Assistant Examiner* — Jingli Wang
(74) *Attorney, Agent, or Firm* — Aaron Fong; American Honda Motor Co., Inc.

(57) ABSTRACT

A system and method for various vehicle-related applications is provided. The system includes a brain-machine interface (BMI) including a plurality of electrodes and control circuitry coupled to the plurality of electrodes. The control circuitry captures a plurality of brainwave signals via the plurality of electrodes and determines control information indicative of an intention to perform a specific task using one or more components of the vehicle. The control information is determined based on the captured plurality of brainwave signals. Further, the control circuitry controls the one or more components of the vehicle so as to provide assistance to perform the specific task. The one or more components of the vehicle are controlled based on the determined control information.

20 Claims, 9 Drawing Sheets

SYSTEM AND METHOD FOR VARIOUS VEHICLE-RELATED APPLICATIONS

BACKGROUND

With advancements in assistance technology for vehicle riders (e.g., two-wheeler riders), there has been development of many solutions that aim to provide assistance to vehicle riders in course of a journey. For example, some of the vehicles include an advance driver-assistance system (ADAS) which provides driving suggestions, driving related warnings, cruise control, pedestrian crash avoidance mitigation (PCAM), incorporates satnav/traffic warnings, lane departure warning system, automatic lane centering, or blind spot monitoring to vehicle riders. Typically, conventional solutions miss to incorporate many human factors, for example, experience level of the rider. Therefore, in many instances, these conventional solutions may be ineffective or less useful for an inexperienced or amateur rider who may want to perform certain maneuvers or tasks (e.g., a parking maneuver) using the vehicle, but may be unable to so for any particular reason. Also, most of the conventional solutions still either require some kind of a user input (e.g., a voice/touch input) or only provide suggestions on how to perform an efficient maneuver or a task (e.g., an efficient parking maneuver), which may be less useful for the inexperienced or amateur rider.

Further limitations and disadvantages of conventional and traditional approaches will become apparent to one of skill in the art, through comparison of described systems with some aspects of the present disclosure, as set forth in the remainder of the present disclosure and with reference to the drawings.

SUMMARY

An exemplary aspect of the disclosure provides a system for a vehicle. The system includes a Brain-Machine Interface (BMI) including a plurality of electrodes and control circuitry coupled to the plurality of electrodes. The control circuitry may capture a plurality of brainwave signals via the plurality of electrodes and determine control information indicative of an intention to perform a specific task using one or more components of the vehicle. The control information may be determined based on the captured plurality of brainwave signals. Further, the control circuitry may control the one or more components of the vehicle so as to provide assistance to perform the specific task. The one or more components of the vehicle may be controlled based on the determined control information.

Another exemplary aspect of the disclosure provides a vehicle which includes control circuitry communicatively coupled to a Brain-Machine Interface (BMI) including a plurality of electrodes. The control circuitry may capture a plurality of brainwave signals via the plurality of electrodes and determine control information indicative of an intention to perform a specific task using one or more components of the vehicle. The control information may be determined based on the captured plurality of brainwave signals. Further, the control circuitry may control the one or more components of the vehicle so as to provide assistance to perform the specific task. The one or more components of the vehicle may be controlled based on the determined control information.

Another exemplary aspect of the disclosure provides a method for providing assistance for controlling components of a vehicle. The method may include capturing a plurality of brainwave signals via a plurality of electrodes of a BMI and determining control information indicative of an intention to perform a specific task using one or more components of the vehicle. The control information may be determined based on the captured plurality of brainwave signals. Further, the method may include controlling the one or more components of the vehicle so as to provide assistance to perform the specific task. The one or more components of the vehicle may be controlled based on the determined control information.

DETAILED DESCRIPTION

Various embodiments of the present disclosure may be found in a system for a vehicle. The disclosed system includes a Brain-Machine Interface (BMI) which may non-invasively capture brainwave signals from a user (i.e. a rider/occupant of a vehicle) and may determine control information which may be indicative of user's intent to perform certain tasks, such as, but not limited to, vehicle acrobatic maneuvers, preemptive maneuvers, vehicle driving maneuvers, or to access certain accessibility features of the vehicle. The user's intent may be detected based on captured brainwave signals acquired in real time or near real time in the course of the journey. Further, the disclosed system may control certain components (e.g., braking/clutch assembly) of the vehicle so as to provide assistance to the user and enhance or allow the user to experience a ride by providing real time control of certain components of the vehicle based on merely detecting the user's intent to perform certain tasks. By providing assistance, the disclosed system may help inexperienced users of the vehicle to comfortably perform certain tasks, which may otherwise require skill sets of an experienced user (or a professional user) of the vehicle.

The disclosed system may further ensure comfort and add to an overall driving experience as it may even identify if the user has intent to correct certain issues, such as an intent to correct a lean angle of a two-wheeler vehicle, correct a steering angle, slow down near a speed breaker, or switch to alternate vehicle route. As the intentions may change in course of the journey, the disclosed system may track changes in the user's intent and seamlessly provide assistance to the user in real time or near real time. In certain instances, the disclosed system may further use memory access information of the user over a period of time to identify whether the user is still an in-experienced user or whether the user has progressed to become an experienced user and is eligible to perform certain tasks with lesser requirement for assistance of the disclosed system and has learned to be more confident of his/her skills. This may help the disclosed system to calibrate and/or lift off a certain degree of the control over certain components (e.g., braking/clutch assembly) of the vehicle to ensure that the user is able to exercise more control over such components of the vehicle.

Figure 1:
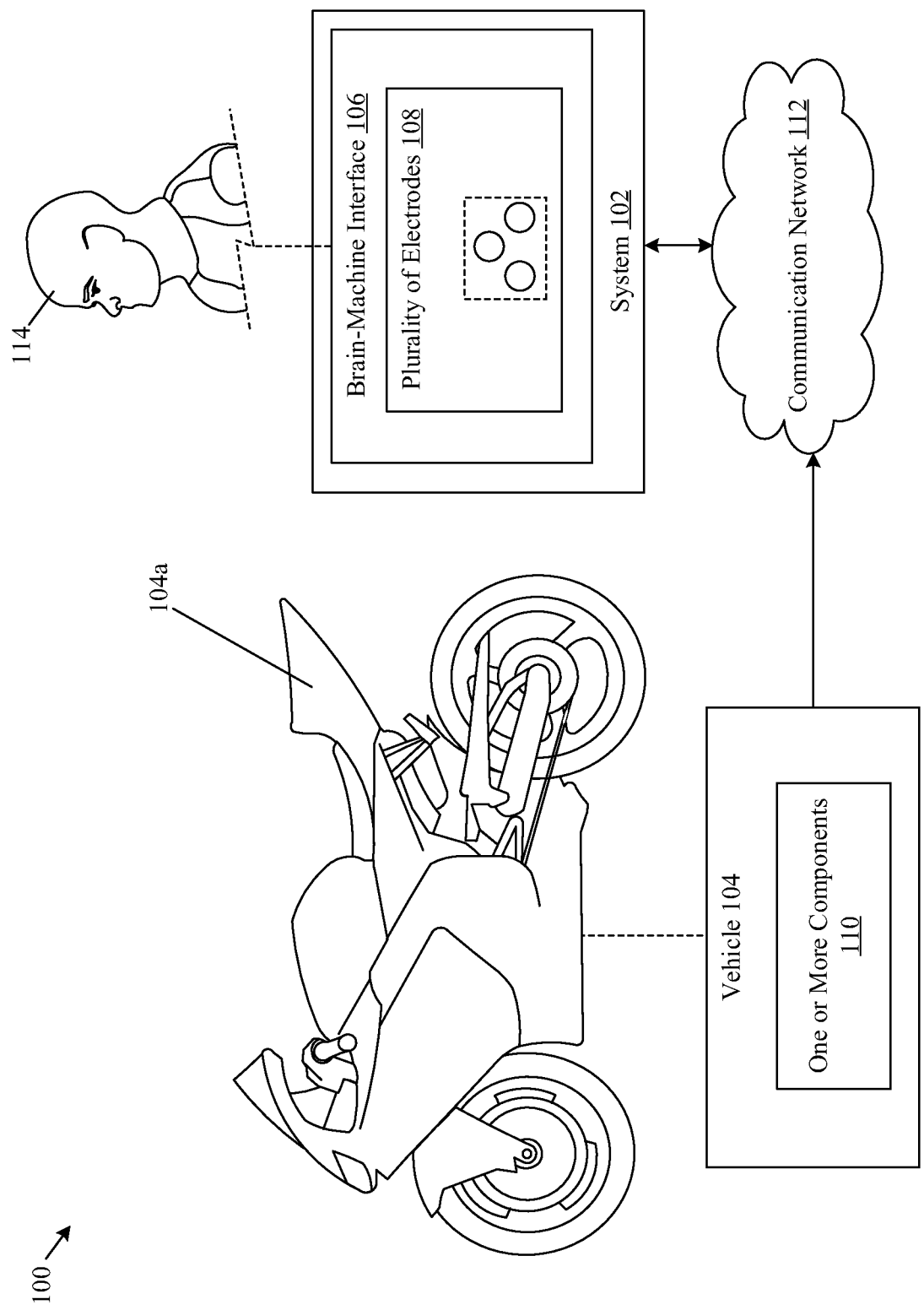
FIG. 1 illustrates an exemplary environment for providing assistance for controlling components of a vehicle, in accordance with an embodiment of the disclosure.

FIG. 1 illustrates an exemplary environment for providing assistance for controlling components of a vehicle, in accordance with an embodiment of the disclosure. With reference to FIG. 1, there is shown an exemplary environment 100. In the exemplary environment 100, there is shown a system 102 and a vehicle 104. The system 102 may include a Brain-Machine Interface (hereinafter, "BMI") 106. The BMI 106 may include a plurality of electrodes 108. The vehicle 104 may include one or more components 110 which may be controlled by a dedicated Electronic Control Unit (hereinafter, "ECU", not shown in FIG. 1) of the vehicle 104 and/or based on instructions of the BMI 106. There is further shown a communication network 112 which may be established among the system 102, the vehicle 104, and/or other communication devices (e.g., Dedicated Short Range Communication-Roadside Units (DSRC-RSUs) which are omitted from the disclosure for the sake of brevity. There is further shown a user 114 who may be a driver or an occupant of the vehicle 104. The plurality of electrodes 108 of the BMI 106 may be arranged to non-invasively contact at least the scalp, the hair, or the skin around the head of the user 114.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle 104a, a three-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the two-wheeler vehicle 104a may include, but are not limited to, an electric two-wheeler, an internal combustion engine (ICE)-based two-wheeler, or a hybrid two-wheeler.

It may be noted here that the two-wheeler vehicle 104a is merely shown as examples in FIG. 1. The present disclosure may be also applicable to other types of vehicles (e.g., a scooter). The description of other components of the vehicle 104 has been omitted from the disclosure for the sake of brevity.

The BMI 106 may include suitable logic, circuitry, interfaces, and/or code that may capture a plurality of brainwave signals via the plurality of electrodes 108. The BMI 106 may further determine control information indicative of an intention of the user 114 to perform certain tasks, for example, to perform certain driving maneuvers like, a wheelie, a parking maneuver, or a braking maneuver. The BMI 106 may further provide control signals to the ECU of the vehicle 104 to control one or more components 110 of the vehicle 104 and to further provide assistance to the user 114 to perform certain tasks based on the intent of the user 114.

Although not shown in FIG. 1, the BMI 106 may include a signal processing circuitry which may capture, in analog form, a plurality of raw brainwave signals including certain noisy/parasitic or unwanted signal components. The signal processing circuitry may further apply one or more signal processing operations including, but not limited to, Analog/Digital (A/D) conversion, sampling, signal filtering, denoising, quantizing, and/or signal frame estimation. The captured plurality of brainwave signals may be obtained after application of the one or more signal processing operations.

The plurality of electrodes 108 may act as a receiver and/or a carrier of the plurality of raw brainwave signals captured from the head of the user 114. In some exemplary embodiments, the plurality of electrodes 108 may be present non-invasively at different locations around the head of the user 114 and may have a contactless arrangement with the head of the user 114. Alternatively, the plurality of electrodes 108 may have a contacting arrangement with the head (e.g., with hair, skin, scalp, etc.) of the user 114. In certain other embodiments, the plurality of electrodes 108 may be invasive electrodes, inserted in the head of the user 114 at different locations. Examples of the plurality of electrodes 108 may include, but are not limited to, stainless steel electrodes, Micro Electro Mechanical System (MEMS) dry electrodes, electrode caps, electrode bands, reusable disk-based electrodes, adhesive gel electrodes, or sub-dermal needle-based electrodes. In an exemplary embodiment, the plurality of electrodes 108 may be a plurality of electroencephalogram (EEG) electrodes and in such a case, the captured plurality of brainwave signals may include EEG signals.

The communication network 112 may be a communication medium through which different internal and peripheral electronic components of the vehicle 104 may communicate with the BMI 106. For example, the communication network 112 may be exemplarily established between an ECU of the vehicle 104 and the BMI 106. In certain embodiments, the communication network 112 may be established to facilitate the different internal and peripheral electronic components of the vehicle 104 to communicate with each other and/or with other vehicles, such as other two-wheelers or four-wheelers in vicinity of the vehicle 104. Also, in certain other embodiments, the communication network 112 may be established to facilitate the different internal and peripheral electronic components of the vehicle 104 to communicate with different types of vehicle servers or external communication devices, such as on-road beacons, on-road electronic displays, RSUs, or mobile devices registered on the communication network 112.

In accordance with an exemplary embodiment, the communication network 112 may be established based on one or more communication standards/protocols, such as Controller Area Network (CAN) protocols, Local Interconnect Network (LIN) protocol, Media Oriented Systems Transport (MOST) protocol, Vehicle Area Network (VAN), or FlexRay standard. Examples of the communication network 112 may include, but are not limited to, internet, Internet-based mobile ad hoc networks (IMANET), a cellular network, such as a 3G, 4G, or 5G network, a cloud network, and/or a Wide Area Network (WAN). Various devices in the exemplary environment 100 may connect to the communication network 112 in accordance with various wireless communication protocols. Examples of such wireless communication protocols may include, but are not limited to, IEEE 802.11, 802.11x, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), LTE, File Transfer Protocol (FTP), ZigBee, EDGE, Li-Fi, and/or other wireless communication protocols.

In operation, the BMI 106 may capture the plurality of brainwave signals emanating from the head of the user 114 via the plurality of electrodes 108. The plurality of brainwave signals may be captured in real time or near-real time while the user 114 rides the vehicle 104. The plurality of electrodes 108 may be located in relation to different cortical areas of the brain of the user 114. In order to reliably and precisely measure electrical activity of the different cortical areas that may be linked to a cognitive process of the user 114, the plurality of electrodes 108 may be present in accordance with an electrode placement system, for example, the international "10-20" system. The locations of the plurality of electrodes 108 (as depicted in FIG. 1) corresponds to different areas of the parietal lobe of the brain. Notwithstanding the locations of the plurality of electrodes 108 corresponding to different areas of the parietal lobe, the present disclosure may be also applicable to other cortical areas of the cerebral cortex of the brain.

In one or more embodiments, the BMI 106 may detect one or more signal types in the captured plurality of brainwave signals. Such different signal types may be indicative of a cognitive process, a stimulus, or a cognitive response to the stimulus experienced by the user 114 in course of the journey. Examples of the different signal types may include, but are not limited to, event-related potential (ERP) signal types, induced potential signal types, and evoked potential signal types, such as visually evoked potential signal types, auditory evoked potential signal types, and somatosensory evoked potential signal types. In some cases, the evoked potential signal types may be steady state evoked potential signal types which corresponds to a form of response to repetitive sensory stimulus in which different frequency components of the response remain a constant in time.

Once captured, the BMI 106 may determine control information based on the captured plurality of brainwave signals from the head of the user 114. The control information may be indicative of intention of the user 114 to perform a specific task using one or more components 110 of the vehicle 104. Examples of the one or more components 110 may include, but are not limited to, ECU, a brake assembly, a transmission unit, a suspension assembly, an engine assembly, and a clutch assembly. In certain embodiments, the one or more components 110 may include a user assistive device which may be one of a wheelchair, an advanced driver-assistance system (ADAS), an in-vehicle infotainment system, an in-vehicle wearable electronic device, a seat control system, a lighting control system, an outer rear view mirror (ORVM), an in-vehicle display device, a heads-up display (HUD), or a Heating, Ventilation, and Air Conditioning (HVAC) system.

In an exemplary scenario, the specific task may correspond to a vehicle acrobatic maneuver of a plurality of vehicle acrobatic maneuvers including, but not limited to, a wheelie, a stoppie, a hyper spin, a switchback, or a burnout. In another exemplary scenario, the specific task may correspond to a vehicle driving maneuver of a plurality of vehicle driving maneuvers including, but not limited to, a left turning maneuver, a right turning maneuver, a braking maneuver, a reversing maneuver, an accelerating maneuver, a decelerating maneuver, a parking maneuver, a traffic circling maneuver, a stopping maneuver, and an overtaking maneuver. In another exemplary scenario, the specific task may correspond to a hands-free control of the user assistive device inside the vehicle 104. In another exemplary scenario, the specific task may correspond to an intent to perform a maneuver to prevent the user 114 from certain fatal or non-fatal danger, to avoid damage to any component of the vehicle 104/other vehicles/property, and/or to avoid certain fatal or non-fatal dangers to people in vicinity of the vehicle 104.

In certain embodiments, the BMI 106 may detect a plurality of ERP signals in the captured plurality of brainwave signals. The plurality of ERP signals may be indicative of the intention of the user 114 to perform the specific task. One of the detected plurality of ERP signals may be the "P300" signal and the BMI 106 may determine the control information based on the "P300" signal in the detected plurality of ERP signals.

The BMI 106 may control the one or more components 110 of the vehicle 104 based on the determined control information. The one or more components 110 of the vehicle 104 may be controlled so as to provide assistance to the user 114 to perform the specific task. In certain embodiments, some of the operations described to be performed by the BMI 106 may be instead performed by the vehicle 104, without a deviation from the scope of the disclosure.

Figure 2:
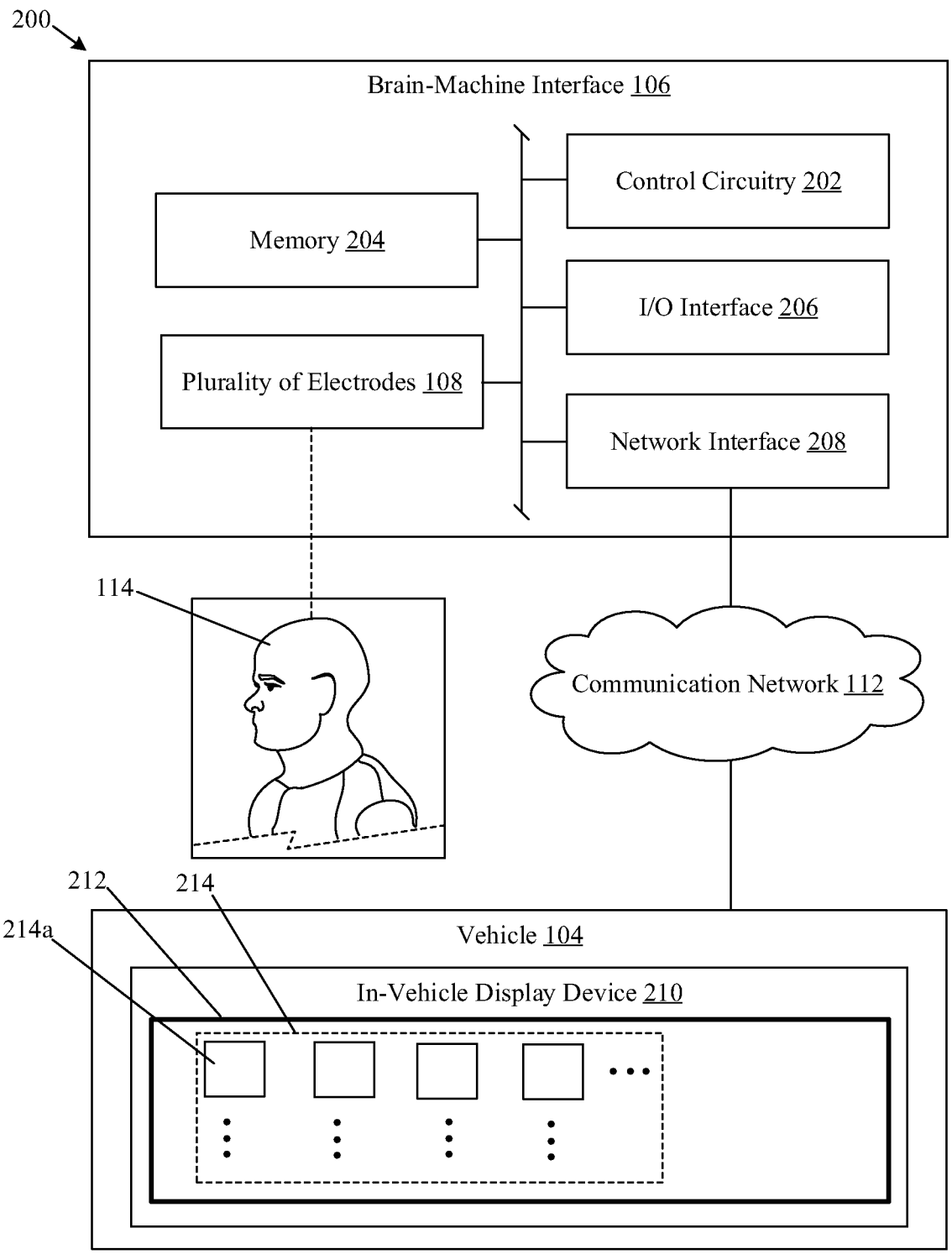
FIG. 2 illustrates a block diagram of an exemplary system which includes a Brain-Machine Interface (BMI) for providing assistance for controlling components of a vehicle, in accordance with an embodiment of the disclosure.

FIG. 2 illustrates a block diagram of an exemplary system which includes a Brain-Machine Interface (BMI) for providing assistance for controlling components of a vehicle, in accordance with an embodiment of the disclosure. FIG. 2 is explained in conjunction with elements from FIG. 1. With reference to FIG. 2, there is shown a block diagram 200 of the BMI 106. The BMI 106 may include the plurality of electrodes 108, control circuitry 202, a memory 204, an input/output (I/O) interface 206, and a network interface 208.

The control circuitry 202 may include suitable logic, circuitry, interfaces, and/or code that may execute a set of instructions stored in the memory 204. The control circuitry 202 may capture a plurality of brainwave signals via the plurality of electrodes 108 and determine control information indicative of intention of the user 114 to perform a specific task. The control circuitry 202 may further control the one or more components 110 of the vehicle 104 so as to provide assistance to the user 114 to perform the specific task. Examples of the control circuitry 202 may include, but are not limited to, an x86-based processor, a Graphical Processing Unit (GPU), a Reduced Instruction Set Computer (RISC) processor, an Application Specific Integrated Circuit (ASIC) processor, a Complex Instruction Set Computer (CISC) processor, a microcontroller, a Central Processing Unit (CPU), and/or a combination thereof.

The memory 204 may include suitable logic, circuitry, and/or interfaces that may store a set of instructions executable by the control circuitry 202. The memory 204 may also store the captured plurality of brainwave signals in a storable format and other intermediate information during the operation of the control circuitry 202. The memory 204 may be a persistent storage medium, a non-persistent storage medium, or a combination thereof. Examples of implementation of the memory 204 may include, but are not limited to, Random Access Memory (RAM), Read Only Memory (ROM), Hard Disk Drive (HDD), Solid State Drive (SSD), flash memory, cache memory, and/or a Secure Digital (SD) card.

The I/O interface 206 may include suitable logic, circuitry, interfaces, and/or code that may receive a plurality of inputs from the user 114 of the vehicle 104 and generate outputs in response to reception of the plurality of inputs. The I/O interface 206 may include various input and output devices that may communicate with different functional components of the BMI 106 and the vehicle 104, via the communication network 112. Examples of the input devices may include, but not limited to, a touch screen, a keyboard, a mouse, a joystick, a microphone, a gesture controller, and/or an image sensor. Examples of the output devices may include, but not limited to, a display screen (such as a Liquid Crystal Display (LCD) or a Light Emitting Diode (LED) display) and/or a speaker.

The network interface 208 may include suitable logic, circuitry, interfaces, and/or code that may enable communication among the BMI 106 and other external devices, such as the one or more components 110 of the vehicle 104, via the communication network 112. The network interface 208 may implement known technologies to support wired and/or wireless communication via the communication network 112. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the control circuitry 202 may capture the plurality of brainwave signals, via the plurality of electrodes 108. The plurality of brainwave signals may be indicative of a cognitive process of the user 114 at a particular time step in the course of the journey. As an example, the plurality of brainwave signals may be captured in the form of raw EEG signals which may represent electrical activity in different areas (such as different cortical areas) of the brain of the user 114. The plurality of brainwave signals may be captured while the plurality of electrodes 108 of the BMI 106 are placed around the head of the user 114.

The control circuitry 202 may determine control information indicative of an intention of the user 114 to perform a specific task using one or more components 110 of the vehicle 104. The specific task may correspond to one of a vehicle acrobatic maneuver, a vehicle driving maneuver, or a hands-free control of the user assistive device inside the vehicle 104. Examples of the specific task may include, but are not limited to, a wheelie, a stoppie, a hyper spin, a switchback, a burnout, a left turning maneuver, a right turning maneuver, a braking maneuver, a reversing maneuver, an accelerating maneuver, a decelerating maneuver, a parking maneuver, a traffic circling maneuver, a stopping maneuver, or an overtaking maneuver.

The control information may be determined based on the captured plurality of brainwave signals. Additionally or alternatively, the control circuitry 202 may apply certain signal processing operations on the plurality of brainwave signals to identify certain patterns in cognitive processes, such as processes which may indicate user's intent to perform a specific task.

For example, in course of the journey, the user 114 may suddenly encounter a tail light of another vehicle at a particular frequency in front side of the vehicle 104 and from a distance of, for example, "10 feet". In such a case, the viewing of the tail light at the particular frequency may stimulate an area of the brain that responds to visual stimulations. The stimulations may further expand to other areas of the brain. In the captured brainwave (such as an EEG signal), visually evoked potential signals may be observed as steady state visually evoked potential (SSVEP) signals which may be indicative of a visual stimuli in the course of the journey. The visual stimuli may be indicative of an intention of the user 114 to slow down or to avoid collision with the other vehicle.

As another example, the control circuitry 202 may detect a plurality of ERP signals in the captured plurality of brainwave signals. The plurality of ERP signals may be indicative of a cognitive reaction to auditory, visual, or somatosensory stimuli in the course of the journey. The plurality of ERP signals may include a series of positive and negative voltage deflections, which may be related to a set of ERP components, such as a contingent negative variation (CNV) and an error-related negativity (ERN). One of the detected plurality of ERP signals may be the "P100" signal which may be indicative of the cognitive reaction to a stimulus and a latency between the cognitive reaction and the stimulus. Alternatively stated, the "P100" signal may indicate a delay between the user's reaction and the auditory, the visual, or the somatosensory stimuli. The delay may further provide a quantitative measure of a response time in case a decision is to be made, for example, intentions to make a turn on the road or apply brakes in case an obstacle is identified by the user 114.

The control circuitry 202 may further control the one or more components 110 of the vehicle 104 so as to provide assistance to perform the specific task. The one or more components 110 of the vehicle 104 may be controlled based on the determined control information. The control over the one or more components 110 of the vehicle 104 may be selected as one of a partial control or a full control based on whether a user control over the one or more components 110 is adequate/correct enough to ensure user's safety and/or an experience level identified and tracked over a period of time.

The specific task may require some level of the user control over the one or more components 110 of the vehicle 104. As an example, in case the user 114 intends to apply a braking maneuver near a speed breaker using a manual transmission system of the two wheeler vehicle, the control circuitry 202 may determine the control information indicative of the intention to perform the braking maneuver and may control one or more of the manual transmission system and/or the braking assembly so as to assist the user 114 to perform the braking maneuver.

As another example, in case the user 114 intends to perform a parking maneuver for a manual transmission motorcycle, the control circuitry 202 may determine the control information indicative of the intention to perform the parking maneuver and may control one or more of the ECU, the transmission system, and/or the braking system so as to assist the user 114 to perform the parking maneuver which may require a timed and sequenced combination of gear shifting maneuver, braking maneuver, stopping maneuver, reversing maneuver, and stopping maneuver.

In one or more exemplary embodiments, the vehicle 104 may include an in-vehicle display device 210 communicatively coupled to the control circuitry 202. The control circuitry 202 may control the in-vehicle display device 210 to display a graphical user interface (hereinafter "GUI") 212 including a plurality of user-selectable options 214. Each user-selectable option of the plurality of user-selectable options 214 may correspond to an accessibility feature associated with the vehicle 104. The control circuitry 202 may detect, from the captured plurality of brainwave signals, a first SSVEP signal which may be indicative of a visual stimuli to a first user-selectable option 214*a* of the plurality of user-selectable options 214. The control circuitry 202 may determine the control information indicative of an intent to select the first user-selectable option 214*a*, based on the detection of the first SSVEP signal. Based on the determined control information, the control circuitry 202 may control the in-vehicle display device 210 to select the first user-selectable option 214*a*.

As an example, in case the user 114 intends to receive a call which is displayed as a notification on the in-vehicle display device 210, the control circuitry 202 may determine the control information indicative of the intention of the user 114 to perform selection of a call pickup option displayed on the in-vehicle display device 210. Further, the control circuitry 202 may control the in-vehicle display device 210 to select the call pickup option so as to assist the user 114 to receive the call. Several examples of specific tasks which may be intended to be performed by the user 114 are provided in FIGS. 4, 5A, 5B, 6A, and 6B.

In one or more embodiments, the control circuitry 202 may collect memory access information of the user 114. The memory access information may be indicative of whether a long term memory or a short term memory of user's brain is accessed while the user 114 performs the specific task using the vehicle 104. The control circuitry 202 may construct a training dataset that includes the memory access information for each of a plurality of specific tasks performed using the vehicle 104. The training dataset may also include frequency information and an output label indicating an experienced level which may be a categorical variable (e.g., experienced, inexperienced/amateur) or a binary variable (e.g. "0" for an amateur level and "1" for a professional level). The frequency information may indicate a number of times the user 114 accessed one of the long term memory or the short term memory for a specific task of the plurality of specific tasks. Further, in one or more embodiments, the control circuitry 202 may build a deep learning model by training a deep neural network on the constructed training dataset. The deep neural network may be trained to classify whether a given memory access information corresponds to one of an experienced level or an amateur level of the user 114. Examples of the deep neural network may include, but are not limited to, a Recurrent Neural Network (RNN), a Long Short-Term Memory (LSTM) network, a LSTM-RNN hybrid network, a convolutional neural network (CNN), or an Artificial Neural Network (ANN).

The control circuitry 202 may determine a driver experience level based on the collected memory access information. As an example, in cases where the memory access information corresponds to a larger access frequency of the long term memory as compared to the short term memory, the driver experience level may be determined to be a learned professional or an experienced rider who may be need lesser assistance in course of the journey. Whereas in cases where the memory access information corresponds to a larger access frequency of the short term memory as compared to the long term memory, the driver experience level may be determined to be a learner or an amateur rider. Alternatively, the control circuitry 202 may determine the experience level and track a learning progress of the user 114 over a time period based on the built deep learning model. Also, in certain instances, the control circuitry 202 may calibrate a level of the control of the one or more components 110 of the vehicle 104 based on the built deep learning model. Specifically, the level of the control over the one or more components 110 of the vehicle 104 may be calibrated based on the determined experienced level of the user 114 and/or the tracked learning progress. This may be performed to ensure that the user 114 is able to enjoy self-driving experience where the control may be eventually reduced as the user 114 learns and gets better with specific tasks which the user 114 intends to perform.

Although, the disclosure provide several examples where the intention of the user 114 is captured and accordingly, the vehicle 104 is controlled so as to provide assistance to the user 114 for what the user 114 intends to perform. However, in certain embodiments, the disclosure may also include provisions to detect certain affective/mental states, for example, a sudden trauma in course of driving or a feeling of drowsiness. Accordingly, the control circuitry 202 may control the one or more components 110 of the vehicle 104 as a preemptive step to avoid any imminent danger to the user 114.

Figure 3:
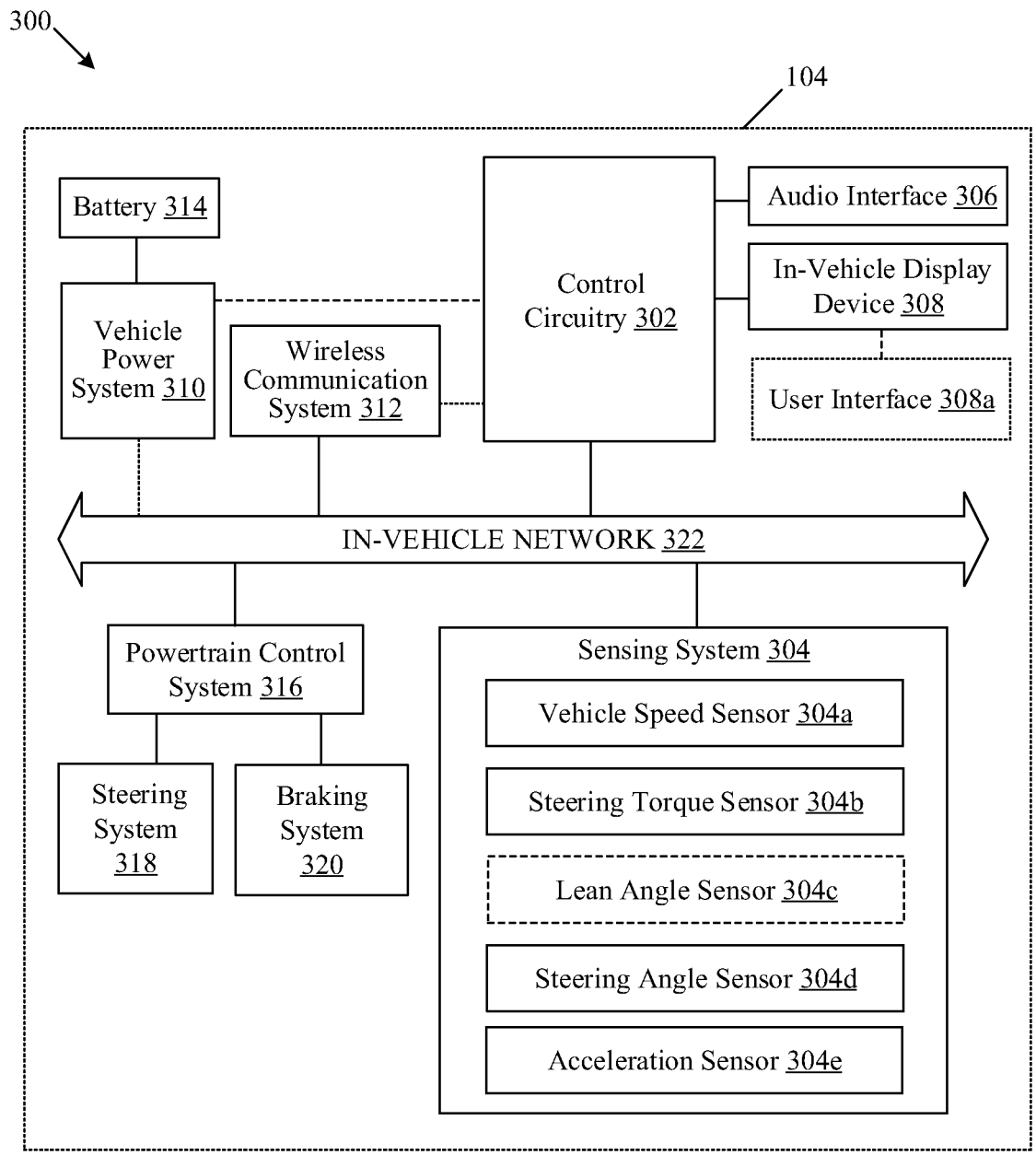
FIG. 3 illustrates a block diagram of an exemplary vehicle for providing assistance to a user for controlling components of a vehicle, in accordance with an embodiment of the disclosure.

FIG. 3 illustrates a block diagram of an exemplary vehicle for providing assistance to a user for controlling components of a vehicle, in accordance with an embodiment of the disclosure. FIG. 3 is explained in conjunction with elements from FIG. 1 and FIG. 2. With reference to FIG. 3, there is shown a block diagram 300 of the vehicle 104, for example, the two-wheeler vehicle 104*a*.

The block diagram 300 of the vehicle 104 may include control circuitry 302 which may be implemented as part of the In-vehicle Infotainment (IVI) system or as part of the ECU (which may include at least a microprocessor and/or a memory). The vehicle 104 may include the one or more components 110 which may include a sensing system 304, an audio interface 306, and an in-vehicle display device 308 communicatively coupled to the control circuitry 302. In some embodiments, the in-vehicle display device 308 may be a part of an infotainment head unit (not shown in FIG. 3). One or more user interfaces (UIs), such as the UI 308*a* may be rendered on the in-vehicle display device 308. The one or more components 110 may further include a vehicle power system 310, a wireless communication system 312, a battery 314, a powertrain control system 316, a steering system 318, and a braking system 320. The control circuitry 202 may communicate with the one or more components 110 of the vehicle 104, via an in-vehicle network 322. The in-vehicle network 322 may facilitate each of the one or more components 110 of the vehicle 104 to communicate with each other. A person of ordinary skilled in the art will understand that the vehicle 104 may also include other suitable components or systems, in addition to the components or systems illustrated herein to describe and explain the function and operation of the present disclosure.

The control circuitry 302 may comprise suitable logic, circuits, interfaces, and/or code that may be configured to execute a set of instructions stored in a memory (not shown in FIG. 3). The control circuitry 302 may control the one or more components 110, such as the sensing system 304, the in-vehicle display device 308, the vehicle power system 310, the powertrain control system 316, the steering system 318, or the braking system 320 of the vehicle 104. Also, in certain embodiments, the control circuitry 302 may retrieve the plurality of brainwave signals from the BMI 106, determine the control information indicative of the intention of the user 114 to perform a specific task using the vehicle 104, and control the one or more components 110 of the vehicle 104 so as to assist the user 114 to perform the specific task. The control circuitry 302 may be a microprocessor. Other examples of the control circuitry 302 may include, but are not limited to a microcontroller, a RISC processor, an ASIC processor, a CISC processor, a microcontroller, a CPU, a graphics processing unit (GPU), a state machine, and/or other processors or circuits.

The sensing system 304 may capture a set of ride parameters associated with the vehicle 104. The set of ride parameters may include, but are not limited to, a steering angle, an acceleration value of the vehicle 104 in a vehicle-width direction, a lean angle of the vehicle 104, a speed of the vehicle 104, and a G-force value on the vehicle 104 in the vehicle-width direction.

The sensing system 304 may include a plurality of vehicle sensors including, but not limited to, a vehicle speed sensor 304a, a steering torque sensor 304b, a lean angle sensor 304c, a steering angle sensor 304d, an acceleration sensor 304e, or an in-vehicle camera (not shown in FIG. 3). The vehicle speed sensor 304a may include suitable logic, circuitry, interfaces, and/or code that may estimate a speed of the vehicle 104 in a direction of the motion of the vehicle 104. The speed may be determined based on a linear displacement of the vehicle 104 or an angular displacement of a front wheel of the vehicle 104. Example of the vehicle speed sensor 304a may include, but are not limited to, Hall effect sensors, variable reluctance speed sensors, Radio Frequency (RF) speed sensors, Amplified (Active) speed sensors, Light Detection and Ranging (LiDAR) speed sensors, accelerometer-based speed sensors, optical speed sensors, and Antilock Braking System (ABS) speed sensors. In some embodiments, the vehicle speed sensor 304a may detect the speed based on engine revolutions, gear ratio, wheel rotation, and the like.

The steering torque sensor 304b may include suitable logic, circuitry, interfaces, and/or code that may estimate a steering torque on a steering portion of the vehicle 104. Example of the steering torque sensor 304b may include, but are not limited to, a non-contact type torque sensor (such as Hall-type sensor) and a contact-type torque sensor (such as a torsion bar-based torque sensor). It may be noted that the estimation of the steering torque may not necessarily depend on the steering torque sensor 304b. In such cases, the steering torque may be estimated based on parameters, such as moment of inertia of a handlebar/steering wheel and an angular acceleration of the handlebar/steering wheel.

The lean angle sensor 304c may include suitable logic, circuitry, interfaces, and/or code that may estimate a lean angle of the two-wheeler vehicle 104a with respect to a vertical position (i.e. a reference position) of the two-wheeler vehicle 104a, i.e. a vertical axis that is normal to the surface of a terrain in use by the two-wheeler vehicle 104a.

The steering angle sensor 304d may include suitable logic, circuitry, interfaces, and/or code that may estimate a steering angle associated with the steering portion of the vehicle 104. The steering angle sensor 304d may be a digital steering angle sensor or an analog steering angle sensor, for example, a potentiometer or a light emitting diode (LED)-based steering angle sensor. In accordance with an embodiment, instead of the steering angle sensor 304d, an output of the steering torque sensor 304b may be used to estimate the steering angle associated with the steering portion of the vehicle 104.

The acceleration sensor 304e may include suitable logic, circuitry, interfaces, and/or code that may estimate the acceleration of the vehicle 104 in the vehicle-width direction. The acceleration may be a measure of a G-force produced in accordance with a turn of the vehicle 104 or the lean angle (i.e. an angle that is made by the two-wheeler vehicle 104a with a vertical axis when leaned over to the right or to the left in the vehicle-width direction). The acceleration sensor 304e may be based on a semiconductor element, such as a micro electro-mechanical system (MEMS) accelerometer sensor.

The audio interface 306 may be connected to a vehicle audio system or other devices that generate a sound. The audio interface 306 may also be connected to a microphone or other devices to receive a voice input from an occupant, such as the user 114 of the vehicle 104. The audio interface 306 may also be communicatively coupled to the control circuitry 302 and may be a part of the infotainment head unit of the vehicle 104.

The in-vehicle display device 308 may comprise suitable logic, circuitry, interfaces, and/or code that may be configured to render various types of information and/or entertainment content via the UI 308a. The UI 308a may be a customized GUI that displays various types of information or receives input to define various settings, for example, call settings, music preferences, notification preferences, and the like. Examples of the in-vehicle display device 308 may include, but are not limited to a display of the infotainment head unit, a projection-based display, a see-through display, and/or an electro-chromic display.

The vehicle power system 310 may regulate the charging and the power output of the battery 314 to various electric circuits and the loads of the vehicle 104. When the vehicle 104 is a hybrid vehicle or an autonomous vehicle, the vehicle power system 310 may provide the required voltage for various components of the vehicle 104 and may enable the vehicle 104 to utilize the battery power for a sufficient amount of time. In accordance with an embodiment, the vehicle power system 310 may include power electronic components and a microcontroller that may be communicatively coupled (shown by dotted lines) to the in-vehicle network 322. The microcontroller may receive one or more commands from the powertrain control system 316 under the control of the control circuitry 302.

The wireless communication system 312 may comprise suitable logic, circuitry, interfaces, and/or code that may be configured to communicate with other vehicles as part of vehicle-to-vehicle (V2V) communication and one or more external devices, such as a RSU or one or more cloud servers, via the communication network 112. The wireless communication system 312 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The wireless communication system 312 may wirelessly communicate by use of various communication protocols of the short or medium range communication channel and the communication network 112.

The battery 314 may be a source of electric power for one or more electric circuits or loads (not shown). For example, the battery 314 may be a source of electrical power to the control circuitry 302, the sensing system 304, the audio interface 306, the in-vehicle display device 308, the vehicle power system 310, or the powertrain control system 316.

The powertrain control system 316 may refer to an onboard computer of the vehicle 104 that controls operations of an engine and a transmission system of the vehicle 104. In some embodiments, the powertrain control system 316 may control ignition, fuel injection (in case of hybrid or non-electric vehicle), emission systems, and/or operations of a transmission system (when provided), and the braking system 320.

The steering system 318 may receive one or more control commands from the control circuitry 302. The steering system 318 may include a steering wheel/handlebar and/or an electric motor (provided for a power-assisted steering) that may be used by a driver to control movement of the vehicle 104 in manual mode or a semi-autonomous mode. In accordance with an embodiment, the movement or steering of the vehicle 104 may be automatically controlled when the vehicle 104 is in autonomous mode. Examples of the steering system 318 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The braking system 320 may be used to stop or slow down the vehicle 104 by application of resistive forces, such as electromagnetic and/or frictional forces. The braking system 320 may receive a command from the powertrain control system 316 under the control of the control circuitry 302 when the vehicle 104 is in an autonomous mode or a semi-autonomous mode. In accordance with an embodiment, the braking system 320 may receive a command from the control circuitry 302 when the control circuitry 302 preemptively detects intent of the user 114 to perform a specific task which requires the user 114 to apply brakes.

The in-vehicle network 322 may include a medium through which the various control units, components, and/or systems of the vehicle 104 may communicate with each other. In accordance with an embodiment, in-vehicle communication of audio/video data may occur by use of Media Oriented Systems Transport (MOST) multimedia network protocol of the in-vehicle network 322 or other suitable network protocols for vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, such as the vehicle 104. The in-vehicle network 322 may facilitate access control and/or communication between the control circuitry 302 and other ECUs, such as ECM or a telematics control unit (TCU) of the vehicle 104.

Various devices or components in the vehicle 104 may connect to the in-vehicle network 322, in accordance with various wired and wireless communication protocols. Examples of the wired and wireless communication protocols for the in-vehicle network 322 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I$^2$C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN). Some or all of the functions and/or operations performed by the control circuitry 202 (as described in FIG. 2) may be performed by the control circuitry 302, without a deviation from the scope of the disclosure.

Figure 4:
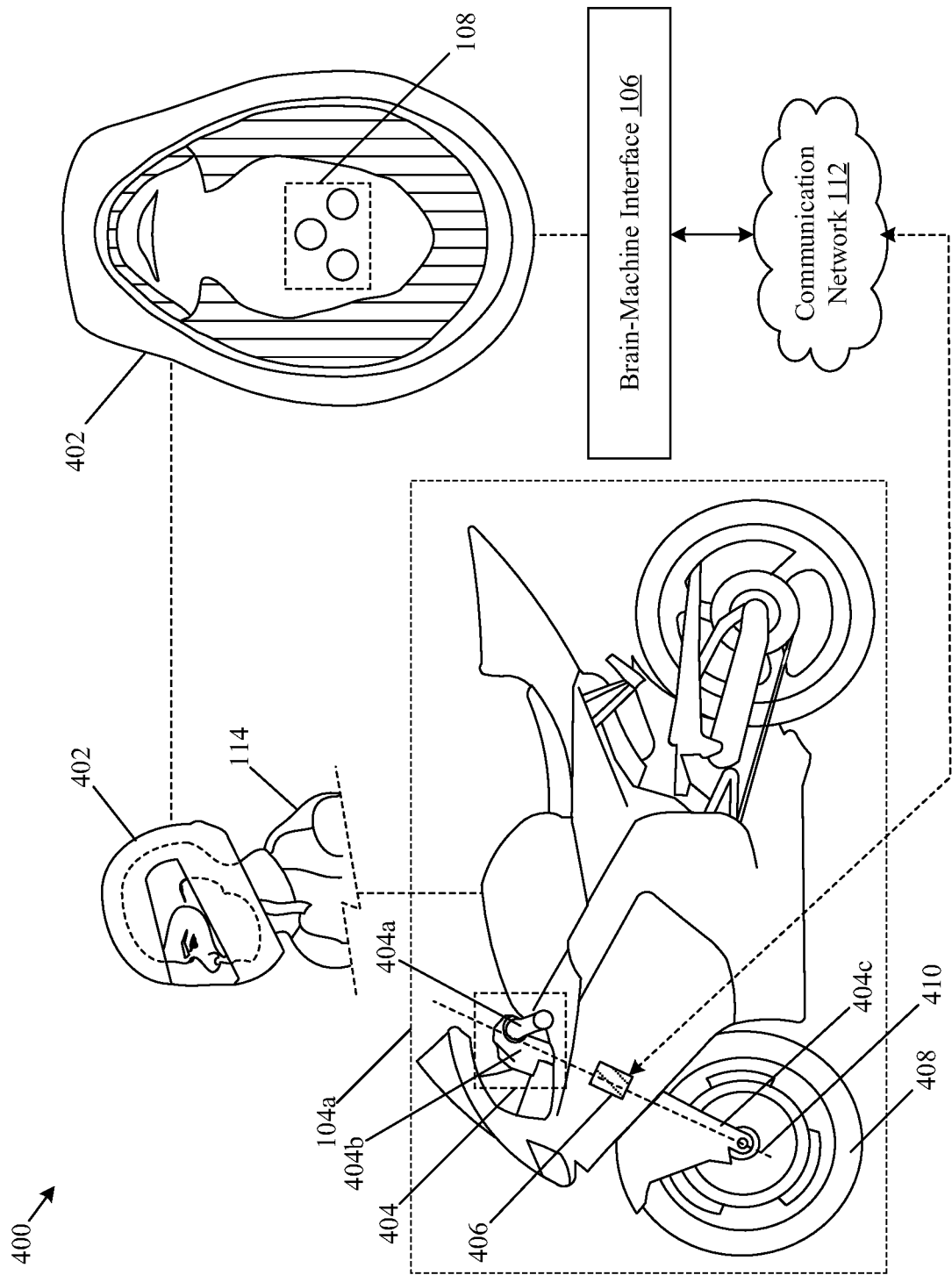
FIG. 4 illustrates a diagram for providing steering assistance for a two-wheeler vehicle, in accordance with an embodiment of the disclosure.

FIG. 4 illustrates a diagram for providing steering assistance for a two-wheeler vehicle, in accordance with an embodiment of the disclosure. FIG. 4 is explained in conjunction with elements from FIGS. 1, 2, and 3. With reference to FIG. 4, there is shown a diagram 400. In the diagram 400, there is shown a helmet 402 which is secured to the head of the user 114 and the two-wheeler vehicle 104a. The BMI 106 may be included in the helmet 402. The two-wheeler vehicle 104a may include one or more components which includes a steering portion 404 and an actuator 406 coupled to the steering portion 404 of the two-wheeler vehicle 104a.

The helmet 402 may primarily act as a protective gear for the user 114 of the two-wheeler vehicle 104a in the course of the journey. Also, the helmet 402 may act as a housing for different components of the BMI 106. In accordance with an embodiment, the helmet 402 may also act as a housing for the plurality of electrodes 108 of the BMI 106 and a support structure for other components of the BMI 106. The helmet 402 (as depicted in FIG. 4) is merely an example of a full-face helmet. However, the present disclosure may be also applicable to other type of helmets, such as a modular helmet (or a flip-up helmet), an open-face helmet (also referred to as a "¾" helmet), a half helmet, an off-road helmet, or a sports helmet.

The steering portion 404 may include a handlebar 404a, a top bridge 404b, left and right front forks 404c, and other components well known in the art. The steering portion 404 may be coupled to a front wheel 408 of the two-wheeler vehicle 104a. The handlebar 404a may be steered to the left side or to the right side by application of a steering torque on either ends of the handlebar 404a. The handlebar 404a may move rotationally about a central axis 410 in response to one of or a combination thereof of a steering action of the user 114 and an application of a torque by the actuator 406.

The actuator 406 may include suitable circuitry and interfaces that drives the steering portion 404 of the two-wheeler vehicle 104a. The actuator 406 may convert power from one or more energy sources, such as electric current, hydraulic fluid pressure, or pneumatic pressure to mechanical action that causes the two-wheeler vehicle 104a to steer in a particular direction. The actuator 406 may receive control signals from the control circuitry 202 or the control circuitry 302 of the two-wheeler vehicle 104a. Based on the received control signals, the actuator 406 may apply a torque on the handlebar 404a of the steering portion 404 based on determined control information indicating an intent of the user 114 to take a turn in either a left or a right direction. Examples of the actuator 406 may include, but is not limited to, a steering electric AC or DC motor, a servo system that includes a hydraulic cylinder, a hydraulic actuator, a pneumatic actuator, a cylinder actuator with an electromagnetic proportional switching valve, a servo motor, a contactless induction-based actuator, a steer-by-wire actuator system, and an electro-hydraulic actuator. In some embodiments, the actuator 406 may be part of an Electric Power Assisted Steering (EPS/EPAS) or Motor-Driven Power Steering (MDPS) system onboard the two-wheeler vehicle 104a.

In operation, the control circuitry 202 may determine control information based on a plurality of brainwave signals which may be captured via the plurality of electrodes 108. The control information may be indicative of an intent of the user 114 to perform a turning maneuver using the two-wheeler vehicle 104a. The control circuitry 202 may further determine a first torque value indicative of a steering torque exerted on the steering portion 404 of the two-wheeler vehicle 104a. The steering torque may be the torque applied in a direction of the steering action on the steering portion 404 of the two-wheeler vehicle 104a.

In an embodiment, the first torque value may be determined by the steering torque sensor 304b based on a first torque component exerted by the steering action of the user 114 and further based on a second torque component induced passively by external driving factors. Examples of such different driving factors may include, but are not limited to, acceleration, deceleration, crosswinds, air drag, driving terrain, vehicle load, road inclination, road declination, road elevation, road turns, and a combination thereof.

In another embodiment, the control circuitry 202 may determine the first torque value based on an angular acceleration value of the handlebar 404a and a stored value of the moment of inertia (I) of the handlebar 404a. In such cases, the angular acceleration value may be retrieved from the sensing system 304, via the communication network 112.

The control circuitry 202 may further determine a second torque value indicative of a corrective torque to be exerted on the steering portion 404 for a stable state of the two-wheeler vehicle 104a based on the determined control information. The second torque value may be a target torque or the corrective torque that may be required to maintain an intended state of the two-wheeler vehicle 104a. The intended state may be a state in which the steering torque (i.e. the determined first torque value on the two-wheeler vehicle 104a) equals the target torque (i.e. the second torque value). In such a case, the two-wheeler vehicle 104a may move in an intended manner.

The control circuitry 202 may compute a deviation of the first torque value from the second torque value based on a difference between the determined first torque value and the determined second torque value. Further, the control circuitry 202 may compare the deviation of the determined first torque value from the determined second torque value with a threshold torque value. In case the computed deviation is greater than or equal to the threshold torque value, the control circuitry 202 may control the actuator 406 to drive the steering portion 404 of the two-wheeler vehicle 104a based on the computed deviation of the determined first torque value from the second torque value. The actuator 406 may be controlled to compensate for the computed deviation of the determined first torque value from the second torque value. In case the computed deviation is less than the threshold torque value, the control circuitry 202 may reject the computed deviation of the determined first torque value from the second torque value.

The steering portion 404 may include the handlebar 404a that may be coupled to the front wheel 408 of the two-wheeler vehicle 104a and the actuator 406. The actuator 406 may drive the steering portion 404 by application of a torque (i.e. an additional steering torque that may equal or approximate the computed deviation) on the handlebar 404a to adjust a displacement-direction of the front wheel 408.

Figure 5A:
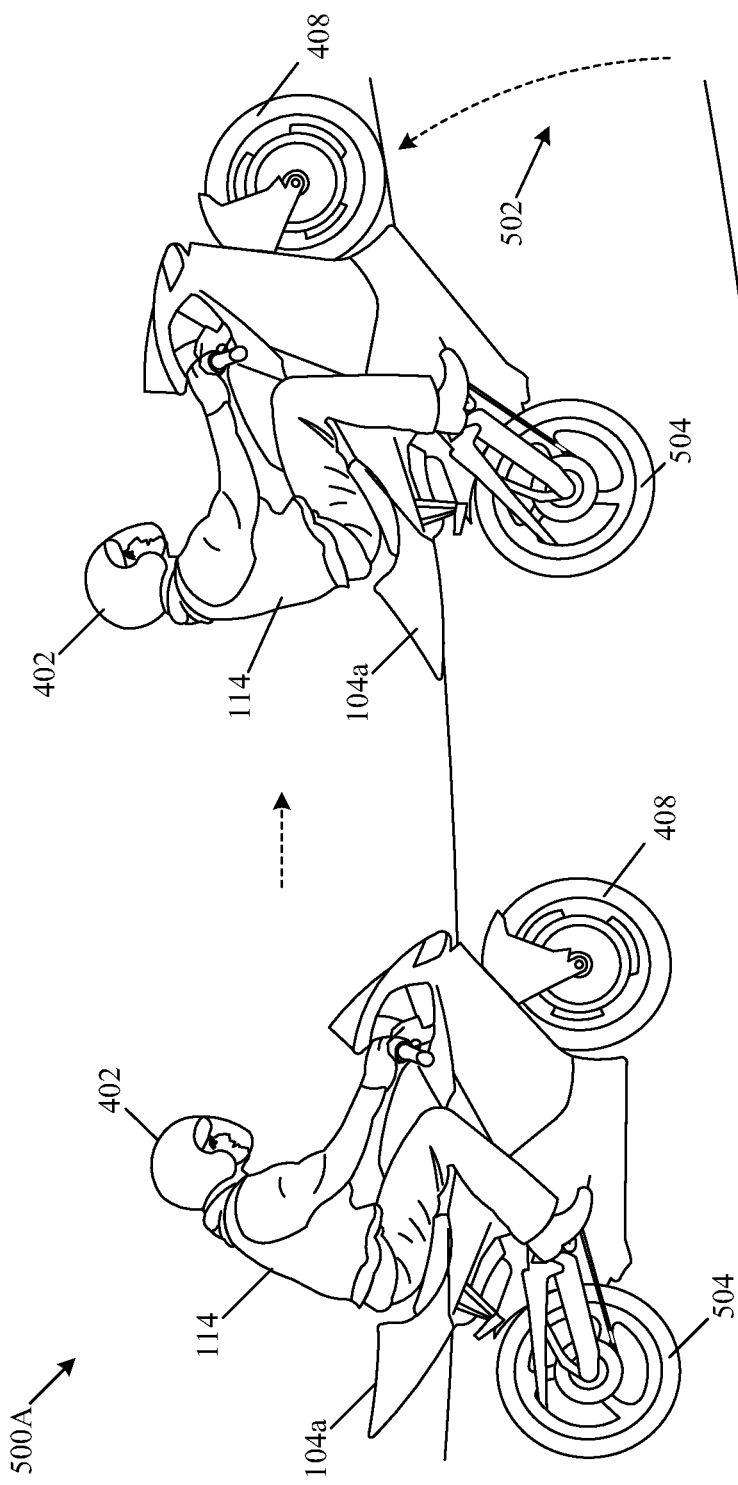
FIG. 5A illustrates an exemplary scenario where assistance is provided for performing a wheelie maneuver, in accordance with an embodiment of the disclosure.

FIG. 5A illustrates an exemplary scenario where assistance is provided for performing a wheelie maneuver, in accordance with an embodiment of the disclosure. FIG. 5A is explained in conjunction with elements from FIGS. 1, 2, 3, and 4. With reference to FIG. 5A, there is shown an exemplary scenario 500A where assistance is provided to the user 114 for performing the wheelie maneuver using the two-wheeler vehicle 104a. The wheelie maneuver may be a clutch-based wheelie maneuver.

The control circuitry 202 (or the control circuitry 302) may determine the control information which may be indicative of user's intent to perform the wheelie maneuver. The control circuitry 202 (or the control circuitry 302) may control one of or a combination thereof of a throttle and a clutch of the two-wheeler vehicle 104a. Once controlled, the throttle may be increased to cross a threshold value and immediately clutches may be pulled to disengage transmission gears. Further, as engine revolution increases, the clutches may be immediately released by a certain amount (e.g., "80%") while the throttle is controlled. This may pull the front wheel 408 of the two-wheeler vehicle 104a to lift up (as shown) against a surface 502 while a rear wheel 504 of the two-wheeler vehicle 104a stays on the ground. In certain instances, the user 114 may control the clutch while the control circuitry 202 (or the control circuitry 302) controls the throttle. Alternatively, in certain other instances, the user 114 may control the throttle while the control circuitry 202 (or the control circuitry 302) controls the clutch. Alternatively, the control circuitry 202 (or the control circuitry 302) may control both the clutch and the throttle while the user 114 maintains a required posture to balance the two-wheeler vehicle 104a.

Figure 5B:
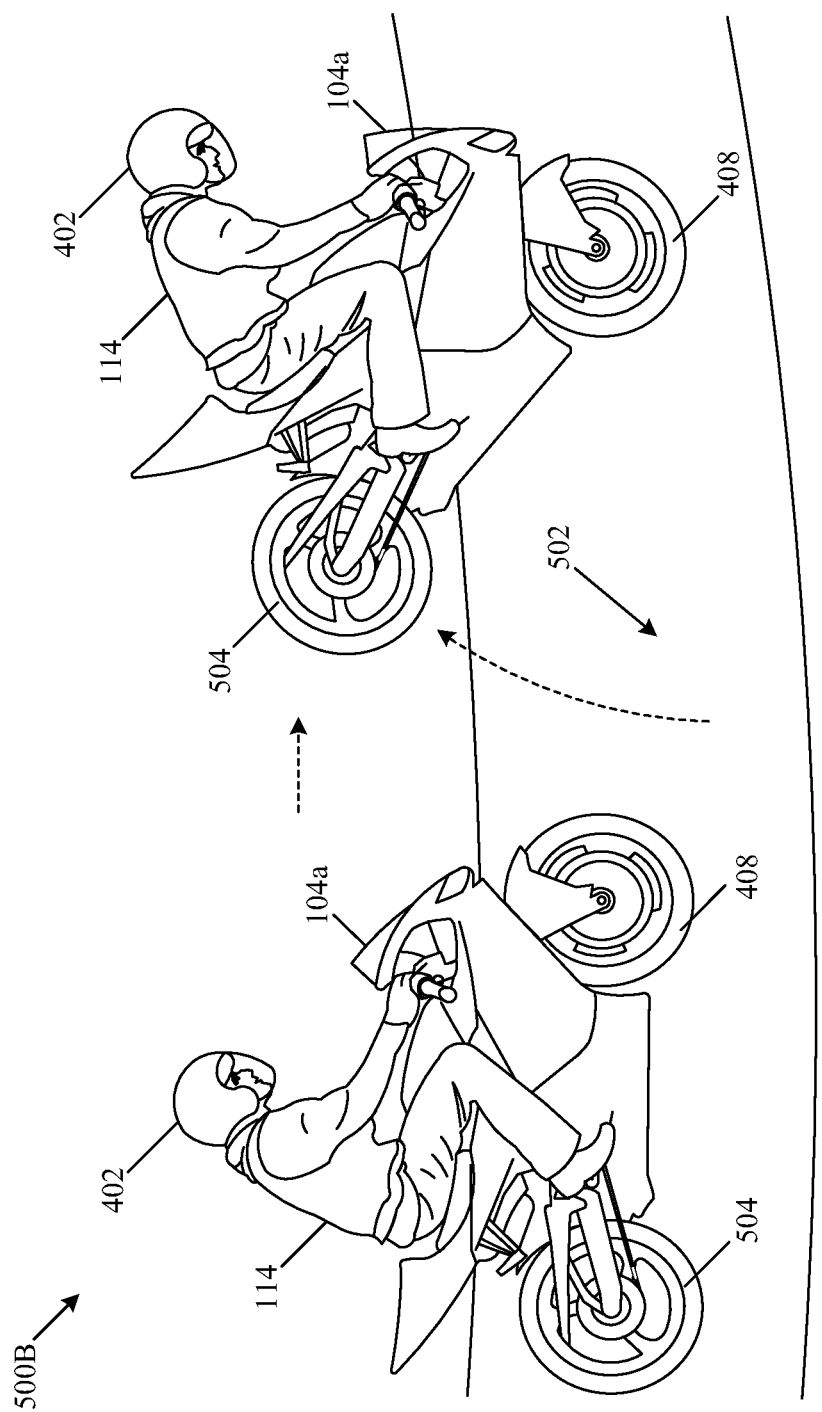
FIG. 5B illustrates an exemplary scenario where assistance is provided for performing a stoppie maneuver, in accordance with an embodiment of the disclosure.

FIG. 5B illustrates an exemplary scenario where assistance is provided for performing a stoppie maneuver, in accordance with an embodiment of the disclosure. FIG. 5B is explained in conjunction with elements from FIGS. 1, 2, 3, 4, and 5A. With reference to FIG. 5B, there is shown an exemplary scenario 500B where assistance is provided to the user 114 for performing a stoppie maneuver using the two-wheeler vehicle 104a.

The control circuitry 202 (or the control circuitry 302) may determine the control information which may be indicative of user's intent to perform the stoppie maneuver. The control circuitry 202 (or the control circuitry 302) may control one of or a combination thereof of the throttle and brakes of the two-wheeler vehicle 104a. Once controlled, the throttle may be increased so as to attain a speed above a threshold value and immediately brakes may be applied. This may pull the rear wheel 504 of the two-wheeler vehicle 104a to lift up (as shown) against the surface 502 while the front wheel 408 stays on the ground. In certain instances, the user 114 may control the brakes while the control circuitry 202 (or the control circuitry 302) controls the throttle. Alternatively, in certain other instances, the user 114 may control the throttle while the control circuitry 202 (or the control circuitry 302) controls the brakes. Alternatively, the control circuitry 202 (or the control circuitry 302) may control both the clutch and the brakes while the user 114 leans forward to balance the two-wheeler vehicle 104a.

Figure 6A:
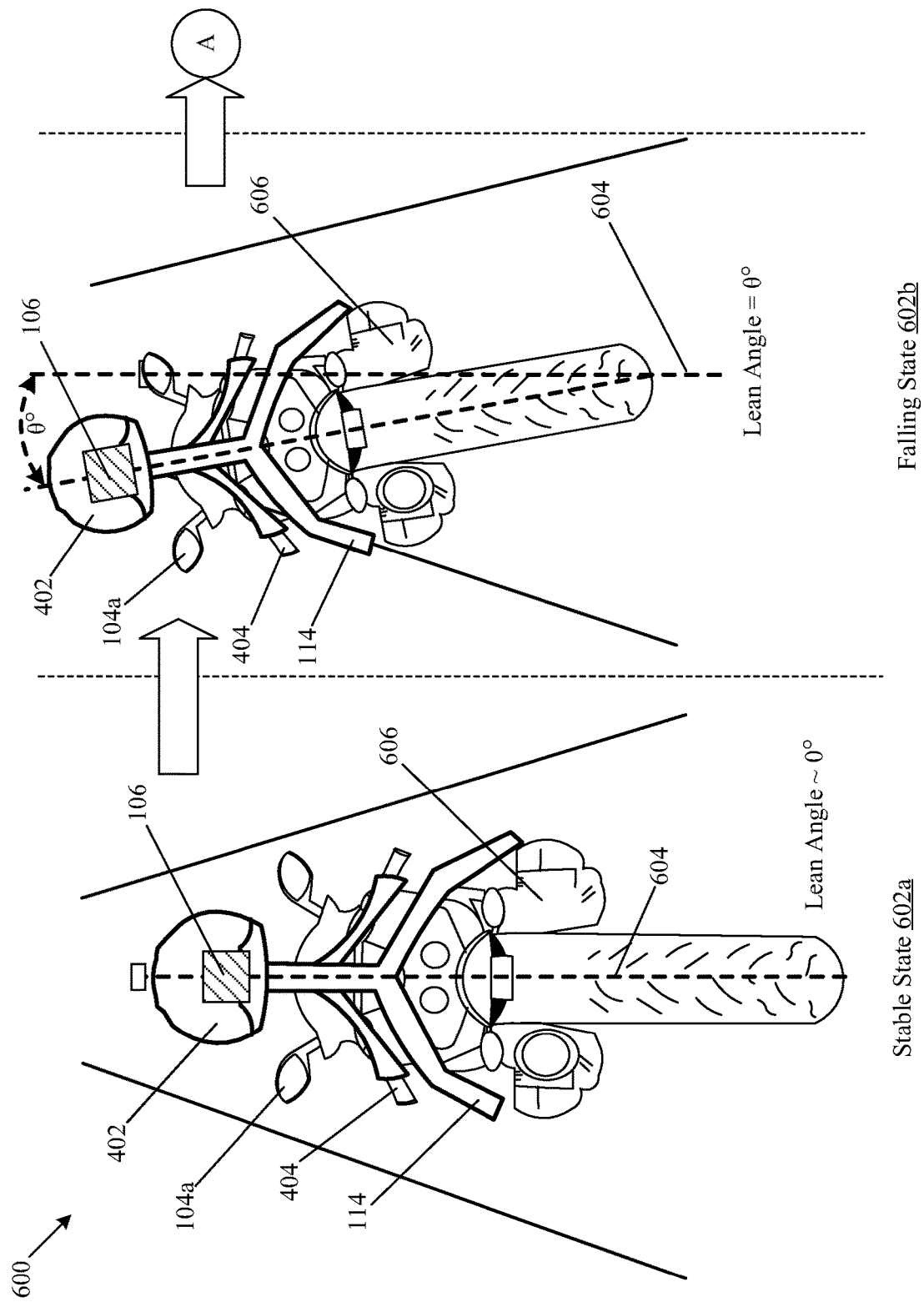
FIGS. 6A and 6B, collectively, illustrate an exemplary scenario for providing steering assistance for a two-wheeler vehicle, in accordance with an embodiment of the disclosure.
Figure 6B:
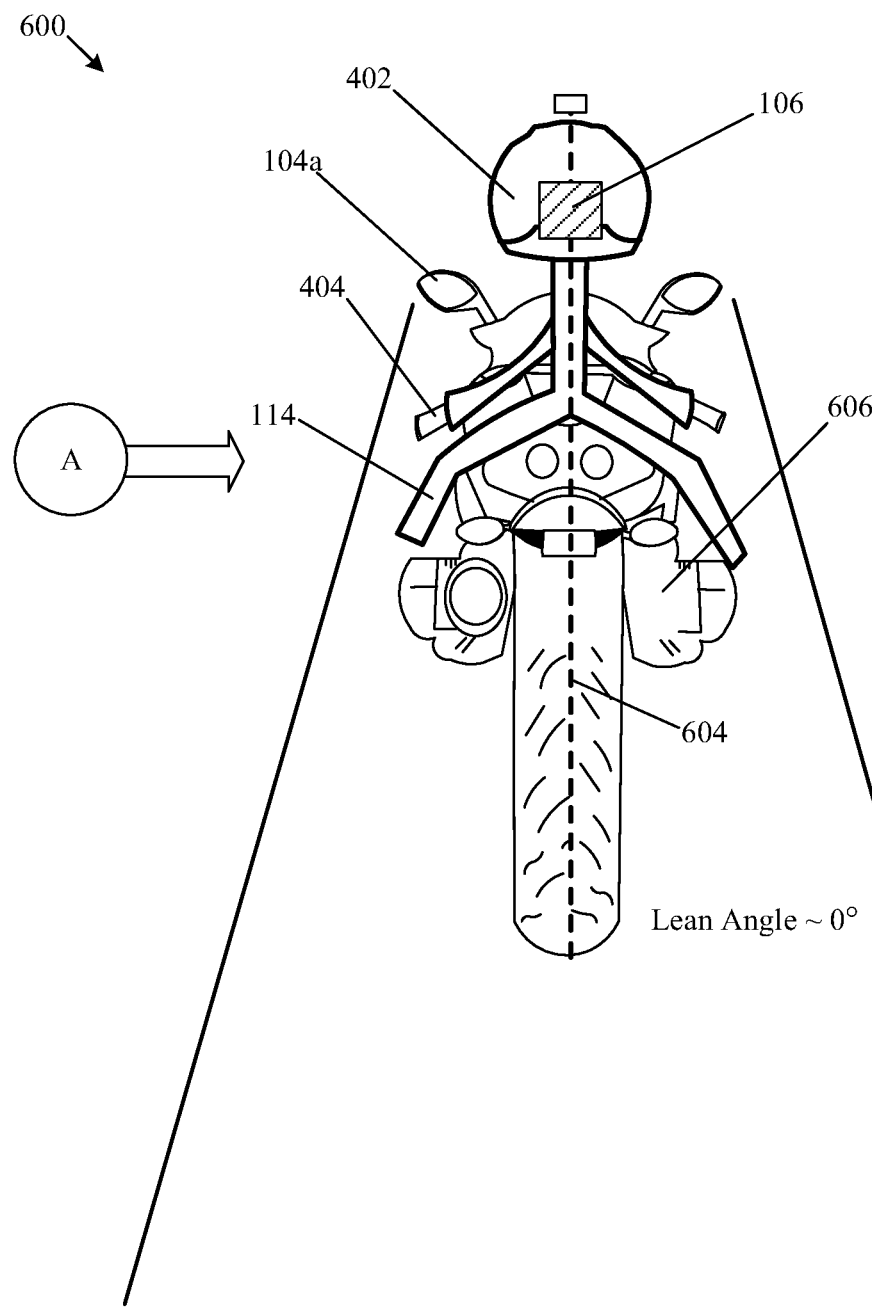

FIGS. 6A and 6B, collectively, illustrate an exemplary scenario for providing steering assistance for a two-wheeler vehicle, in accordance with an embodiment of the disclosure. FIGS. 6A and 6B are explained in conjunction with elements from FIGS. 1, 2, 3, 4, 5A, and 5B. With reference to FIGS. 6A and 6B, there is shown an exemplary scenario 600 that depicts how the two-wheeler vehicle 104a transitions from a stable state 602a to a falling state 602b in course of the journey and further depicts how the two-wheeler vehicle 104a transitions again from the falling state 602b to a stable state 602c. In the exemplary scenario 600, there is shown the two-wheeler vehicle 104a, the user 114, the helmet 402 worn by the user 114, and the BMI 106 included in the helmet 402. For reference, a vertical axis 604 is shown to indicate a lean angle (theta, θ) of the two-wheeler vehicle 104a with the vertical axis 604 in each of the stable state 602a, the falling state 602b, and the stable state 602c.

In the stable state 602a, at a particular time in the course of the journey, the two-wheeler vehicle 104a may move on the road on a straight path, where the lean angle (θ) of the two-wheeler vehicle 104a with respect to the vertical axis 604 remains zero or nearly zero ("~0°"). In the stable state 602a, no additional steering torque may be required and the two-wheeler vehicle 104a may continue to move along the intended direction in a balanced manner.

In the course of the journey, the user 114 may encounter that the lean angle (θ) of the two-wheeler vehicle 104a is abnormal and may potentially cause the two-wheeler vehicle 104a to loose balance and fall on the ground. The control circuitry 202 may determine control information which may be indicative of the intent of the user 114 to balance the two-wheeler vehicle 104a. The indicated intent may reflect a preemptive measure of the user 114 to avoid any unintended fatal/non-fatal situation. The control information may be determined based on the plurality of brainwave signals which may be captured via the plurality of electrodes 108.

The control circuitry 202 may detect the falling state 602b of the two-wheeler vehicle 104a in the course of the journey based on a set of ride parameters associated with the two-wheeler vehicle 104a and the determined control information. The falling state 602b may correspond to a first direction in which the two-wheeler vehicle 104a leans to fall. Also, the falling state 602b may correspond to a state in which the steering portion 404 of the two-wheeler vehicle 104a experiences a steering torque that is either less than or greater than the required steering torque on the steering portion 404. The control circuitry 202 may further control the actuator 406 to turn the front wheel 408 in a second direction that may be opposite to the first direction. The front wheel 408 may be turned to change the falling state 602b of the two-wheeler vehicle 104a to the stable state 602c. In the stable state 602c, the two-wheeler vehicle 104a may remain straight to make a lean angle ("φ=~0°") with the vertical axis 604.

In certain embodiments, the two-wheeler vehicle 104a may include a self-balancing system 606. The control circuitry 202 may control the self-balancing system 606 to adjust a set of self-balancing parameters of the two-wheeler vehicle 104a to change the falling state 602b of the two-wheeler vehicle 104a to the stable state 602c. The set of self-balancing parameters may include, but are not limited to, a positive trail length, a negative trail length, a lean angle, or a gyroscopic parameter. As an example, upon detection of the falling state 602b, the control circuitry 202 may change the trail length associated with the two-wheeler vehicle 104a from the positive trail length to the negative trail length to change from the falling state 602b to the stable state 602c of the two-wheeler vehicle 104a.

Figure 7:
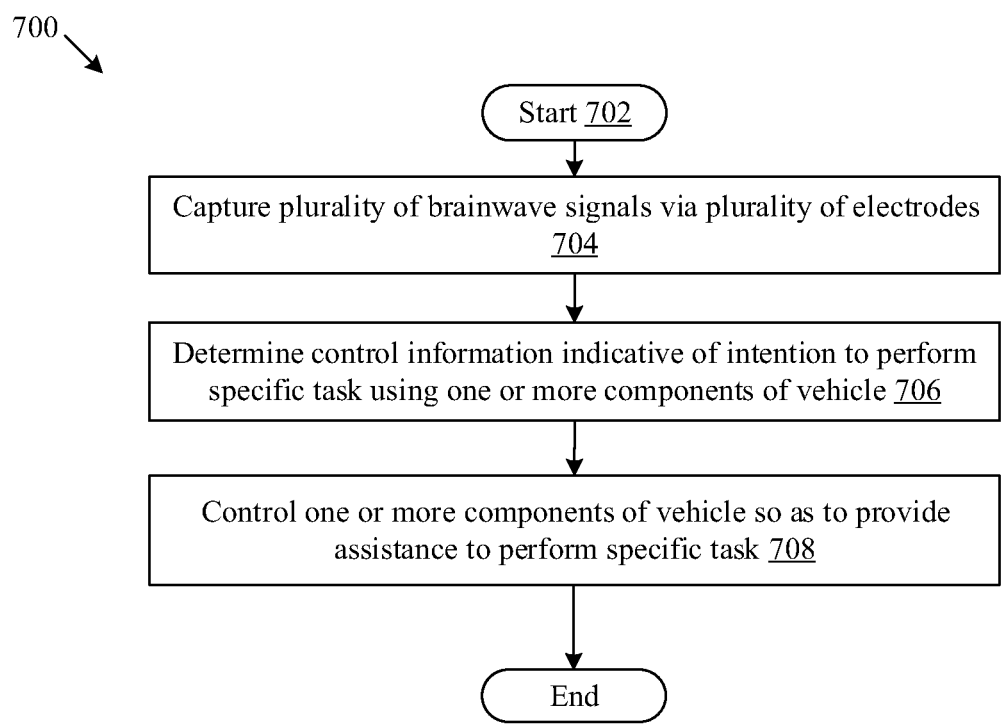
FIG. 7 illustrates a flowchart of an exemplary method for providing assistance for controlling components of a vehicle, in accordance with an embodiment of the disclosure.

FIG. 7 illustrates a flowchart of an exemplary method for providing assistance for controlling components of a vehicle, in accordance with an embodiment of the disclosure. FIG. 7 is explained in conjunction with elements from FIGS. 1, 2, 3, 4, 5A, 5B, 6A, and 6B. With reference to FIG. 7, there is shown a flowchart 700. The method illustrated in the flowchart 700 may start at 702 and proceed to 704. The method illustrated in the flowchart 700 may be performed by any suitable system, apparatus, or device, such as by the control circuitry 202, or the control circuitry 302.

At 704, a plurality of brainwave signals may be captured via the plurality of electrodes 108. In one or more embodiments, the control circuitry 202 may capture the plurality of brainwave signals via the plurality of electrodes 108.

At 706, control information indicative of the intention to perform a specific task using the one or more components 110 of the vehicle 104 may be determined. The control information may be determined based on the captured plurality of brainwave signals. In one or more embodiments, the control circuitry 202 may determine the control information indicative of the intention to perform a specific task using the one or more components 110 of the vehicle 104.

At 708, the one or more components 110 of the vehicle 104 may be controlled so as to provide assistance to perform the specific task. The one or more components 110 of the vehicle 104 may be controlled based on the determined control information. In one or more embodiments, the control circuitry 202 may control the one or more components 110 of the vehicle 104 so as to provide assistance to perform the specific task. Control may further pass to end. Further details of operations at 804, 806, and 808 may be understood in light of description of FIGS. 1, 2, 3, 4, 5A, 5B, 6A, and 6B.

Exemplary aspects of the disclosure may provide the system 102 for the vehicle 104. The system may include the BMI 106 including the plurality of electrodes 108 and the control circuitry 202 coupled to the plurality of electrodes 108. The control circuitry 202 may capture a plurality of brainwave signals via the plurality of electrodes 108 and determine control information indicative of an intention to perform a specific task using the one or more components 110 of the vehicle 104. The control information may be determined based on the captured plurality of brainwave signals. The control circuitry 202 may control the one or more components 110 of the vehicle 104 so as to provide assistance to perform the specific task. The one or more components 110 of the vehicle 104 may be controlled based on the determined control information.

In accordance with an embodiment, the system 102 may further include the helmet 402. The BMI 106 may be included in the helmet 402 and the vehicle 104 may be the two-wheeler vehicle 104a.

In accordance with an embodiment, the control circuitry 202 may detect a plurality of ERP signals in the captured plurality of brainwave signals. The plurality of ERP signals may be indicative of the intention to perform the specific task. One of the detected plurality of ERP signals may be the "P300" signal. The control circuitry 202 may determine the control information based on the "P300" signal in the detected plurality of ERP signals.

In accordance with an embodiment, the specific task may correspond to a vehicle acrobatic maneuver of a plurality of vehicle acrobatic maneuvers including, but not limited to, a wheelie, a stoppie, a hyper spin, a switchback, or a burnout. The specific task may also correspond to a vehicle driving maneuver of a plurality of vehicle driving maneuvers including, but not limited to, a left turning maneuver, a right turning maneuver, a braking maneuver, a reversing maneuver, an accelerating maneuver, a decelerating maneuver, a parking maneuver, a traffic circling maneuver, a stopping maneuver, or an overtaking maneuver.

In one or more embodiments, the one or more components 110 of the vehicle 104 may include a user assistive device and the specific task may correspond to a hands-free control of the user assistive device. The user assistive device may be one of a wheelchair, ADAS, an in-vehicle infotainment system, an in-vehicle wearable electronic device, a seat control system, a lighting control system, an ORVM, the in-vehicle display device 210, or a HUD.

In accordance with an embodiment, the one or more components 110 of the vehicle 104 may include the in-vehicle display device 210 communicatively coupled to the control circuitry 202. The control circuitry 202 may control the in-vehicle display device 210 to display the GUI 212 including a plurality of user-selectable options 214. Each user-selectable option of the plurality of user-selectable options 214 may correspond to an accessibility feature associated with the vehicle 104. The control circuitry 202 may detect, from the captured plurality of brainwave signals, a first SSVEP signal which may be indicative of a visual stimuli to the first user-selectable option 214a of the plurality of user-selectable options 214. The control circuitry 202 may further determine the control information based on the detection of the first SSVEP signal. The specific task may correspond to an intent to select the first user-selectable option 214a. Based on the determined control information, the control circuitry 202 may control the in-vehicle display device 210 to select the first user-selectable option 214a.

In one or more embodiments, the vehicle 104 may be the two-wheeler vehicle 104a. The one or more components 110 of the two-wheeler vehicle 104a may include the steering portion 404 and the actuator 406 coupled to the steering portion 404 of the two-wheeler vehicle 104a. The determined control information may be indicative of an intent to perform a turning maneuver using the two-wheeler vehicle 104a. The control circuitry 202 may determine a first torque value indicative of a steering torque exerted on the steering portion 404 of the two-wheeler vehicle 104a. Further, the control circuitry 202 may determine a second torque value indicative of a corrective torque to be exerted on the steering portion 404 for a stable state of the two-wheeler vehicle 104a, based on the determined control information. Based on a deviation of the determined first torque value from the second torque value, the control circuitry 202 may control the actuator 406 to drive the steering portion 404 of the two-wheeler vehicle 104a. In an embodiment, the steering portion 404 may include the handlebar 404a coupled to the front wheel 408 of the two-wheeler vehicle 104a and the actuator 406. The actuator 406 may drive the steering portion 404 by application of a torque on the handlebar 404a to adjust a displacement-direction of the front wheel 408. The applied torque may be equal to the deviation.

In one or more embodiments, the determined control information may be indicative of an intent to balance the two-wheeler vehicle 104a. The control circuitry 202 may detect the falling state 602b of the two-wheeler vehicle 104a in a course of a journey, based on a set of ride parameters and the determined control information. The falling state 602b may correspond to a first direction in which the two-wheeler vehicle 104a leans to fall. Further, the control circuitry 202 may control the actuator 406 to turn the front wheel 408 of the two-wheeler vehicle 104a in a second direction that may be opposite to the first direction to change the falling state 602b of the two-wheeler vehicle 104a to the stable state 602c of the two-wheeler vehicle 104a. The set of ride parameters may include, but are not limited to, a steering angle of the steering portion 404, an acceleration value of the two-wheeler vehicle 104a in a vehicle-width direction, a lean angle of the two-wheeler vehicle 104a, a speed of the two-wheeler vehicle 104a, and a G-force value on the two-wheeler vehicle 104a in the vehicle-width direction.

In accordance with an embodiment, the one or more components 110 of the two-wheeler vehicle 104a may include the self-balancing system 606. The control circuitry 202 may control the self-balancing system 606 to adjust a set of self-balancing parameters of the two-wheeler vehicle 104a to change the falling state 602b of the two-wheeler vehicle 104a to the stable state 602c of the two-wheeler vehicle 104a. The set of self-balancing parameters may include, but are not limited to, a positive trail length, a negative trail length, a lean angle, or a gyroscopic parameter.

In one or more embodiments, the control circuitry 202 may collect memory access information indicative of whether a long term memory or a short term memory of user's brain is accessed while performing the specific task using the vehicle 104. The control circuitry 202 may determine a driver experience level based on the collected memory access information. In an embodiment, the control circuitry 202 may construct a training dataset including the memory access information for each of a plurality of specific tasks performed using the vehicle 104 and build a deep learning model by training a deep neural network on the constructed training dataset. In an embodiment, the control circuitry 202 may calibrate a level of the control of the one or more components 110 of the vehicle 104 based on the built deep learning model.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system for a vehicle, the system comprising:
a Brain-Machine Interface (BMI) comprising a plurality of electrodes and control circuitry coupled to the plurality of electrodes,
wherein the control circuitry:
captures a plurality of brainwave signals via the plurality of electrodes;
determines control information indicative of an intention to perform a specific task using one or more components of the vehicle,
wherein the control information is determined based on the captured plurality of brainwave signals;
collects memory access information indicative of whether a long term memory or a short term memory of a driver's brain is accessed while performing the specific task using the one or more components of the vehicle;
determines, based on the collected memory access information, a driver experience level of the driver of the vehicle as one of an inexperienced level of the driver or an experienced level of the driver; and
controls the one or more components of the vehicle based on the determined control information and the determined driver experience level.

2. The system according to claim 1, wherein the control circuitry detects a plurality of event-related potential (ERP) signals in the captured plurality of brainwave signals, and wherein the plurality of ERP signals is indicative of the intention to perform the specific task.

3. The system according to claim 2, wherein the detected plurality of ERP signals comprise a P300 signal.

4. The system according to claim 3, wherein the control circuitry determines the control information based on the P300 signal included in the detected plurality of ERP signals.

5. The system according to claim 1, further comprising a helmet that includes the BMI, wherein the vehicle is a two-wheeler vehicle.

6. The system according to claim 1, wherein the specific task corresponds to a vehicle acrobatic maneuver of a plurality of vehicle acrobatic maneuvers which comprises a wheelie, a stoppie, a hyper spin, a switchback, or a burnout.

7. The system according to claim 1, wherein the specific task corresponds to a vehicle driving maneuver of a plurality of vehicle driving maneuvers, which comprises a left turning maneuver, a right turning maneuver, a braking maneuver, a reversing maneuver, an accelerating maneuver, a decelerating maneuver, a parking maneuver, a traffic circling maneuver, a stopping maneuver, and an overtaking maneuver.

8. The system according to claim 1, wherein the one or more components of the vehicle comprises a user assistive device,
wherein the specific task corresponds to a hands-free control of the user assistive device, and
the user assistive device is one of a wheelchair, an advanced driver-assistance system (ADAS), an in-vehicle infotainment system, an in-vehicle wearable electronic device, a seat control system, a lighting control system, an outer rear view mirror (ORVM), an in-vehicle display device, or a heads-up display (HUD).

9. The system according to claim 1, wherein the one or more components of the vehicle comprise an in-vehicle display device communicatively coupled to the control circuitry, and
wherein the control circuitry:
controls the in-vehicle display device to display a graphical user interface (GUI) comprising a plurality of user-selectable options,
wherein each user-selectable option of the plurality of user-selectable options corresponds to an accessibility feature associated with the vehicle;
detects, from the captured plurality of brainwave signals, a first steady state visually evoked potential (SSVEP) signal which is indicative of a visual stimuli to a first user-selectable option of the plurality of user-selectable options;
determines the control information based on the detection of the first SSVEP signal, wherein the specific task corresponds to an intent to select the first user-selectable option; and
controls the in-vehicle display device to select the first user-selectable option based on the determined control information.

10. The system according to claim 1, wherein the vehicle is a two-wheeler vehicle,
wherein the one or more components of the two-wheeler vehicle comprise a steering portion and an actuator coupled to the steering portion of the two-wheeler vehicle,
wherein the determined control information is indicative of an intent to perform a turning maneuver using the two-wheeler vehicle, and
wherein the control circuitry:
determines a first torque value indicative of a steering torque exerted on the steering portion of the two-wheeler vehicle;
determines a second torque value indicative of a corrective torque to be exerted on the steering portion for a stable state of the two-wheeler vehicle, based on the determined control information; and
controls an actuator to drive the steering portion of the two-wheeler vehicle based on a deviation of the determined first torque value from the second torque value.

11. The system according to claim 10,
wherein the steering portion comprises a handlebar that is coupled to a front wheel of the two-wheeler vehicle and the actuator, and
wherein the actuator drives the steering portion by application of a torque on the handlebar to adjust a displacement-direction of the front wheel, wherein the torque is equal to the deviation.

12. The system according to claim 1, wherein the vehicle is a two-wheeler vehicle,
wherein the one or more components of the two-wheeler vehicle comprise a steering portion and an actuator coupled to the steering portion,
wherein the determined control information is indicative of an intent to balance the two-wheeler vehicle, and
wherein the control circuitry:
detects a falling state of the two-wheeler vehicle in a course of a journey, based on a set of ride parameters and the determined control information, wherein the falling state corresponds to a first direction in which the two-wheeler vehicle leans to fall; and
controls the actuator to turn a front wheel of the two-wheeler vehicle in a second direction that is opposite to the first direction, to change the falling state of the two-wheeler vehicle to a stable state of the two-wheeler vehicle.

13. The system according to claim 12, wherein the set of ride parameters comprises a steering angle of the steering portion, an acceleration value of the two-wheeler vehicle in a vehicle-width direction, a lean angle of the two-wheeler vehicle, a speed of the two-wheeler vehicle, and a G-force value on the two-wheeler vehicle in the vehicle-width direction.

14. The system according to claim 1, wherein the vehicle is a two-wheeler vehicle,
wherein the one or more components of the two-wheeler vehicle comprise a self-balancing system, and
wherein the control circuitry controls the self-balancing system to adjust a set of self-balancing parameters of the two-wheeler vehicle to change a falling state of the two-wheeler vehicle to a stable state of the two-wheeler vehicle.

15. The system according to claim 14, wherein the set of self-balancing parameters comprises a positive trail length, a negative trail length, a lean angle, or a gyroscopic parameter.

16. The system according to claim 1, wherein the control circuitry:
constructs a training dataset comprising the memory access information for each of a plurality of specific tasks performed using the vehicle;
builds a deep learning model by training a deep neural network on the constructed training dataset, wherein the deep neural network is trained to classify whether the memory access information corresponds to one of the inexperienced level of the driver or the experienced level of the driver; and
calibrates a level of the control of the one or more components of the vehicle based on the built deep learning model.

17. The system according to claim 1, wherein the control circuitry calibrates a level of the control of the one or more components of the vehicle, based on the determined driver experience level of the driver with the vehicle and a learning progress of the driver in the specific task over a time period.

18. The system according to claim 1, wherein the control of the one or more components is a partial control, in which the control circuitry controls a first component of the one or more components, and a second component of the one or more components is controlled by the driver of the vehicle.

19. A vehicle, comprising:
control circuitry communicatively coupled to a Brain-Machine Interface (BMI) comprising a plurality of electrodes, wherein the control circuitry:
captures a plurality of brainwave signals via the plurality of electrodes;
determines control information indicative of an intention to perform a specific task using one or more components of the vehicle,
wherein the control information is determined based on the captured plurality of brainwave signals;
collects memory access information indicative of whether a long term memory or a short term memory of a driver's brain is accessed while performing the specific task using the vehicle;
determines, based on the collected memory access information, a driver experience level of the driver of the vehicle as one of an inexperienced level of the driver or an experienced level of the driver; and
controls the one or more components of the vehicle based on the determined control information and the determined driver experience level.

20. A method, comprising:
capturing a plurality of brainwave signals via a plurality of electrodes of a Brain-Machine Interface (BMI),
determining control information indicative of an intention to perform a specific task using one or more components of a vehicle,
wherein the control information is determined based on the captured plurality of brainwave signals;
collecting memory access information indicative of whether a long term memory or a short term memory of a driver's brain is accessed while performing the specific task using the vehicle;
determining, based on the collected memory access information, a driver experience level of the driver of the vehicle as one of an inexperienced level of the driver or an experienced level of the driver; and
controlling the one or more components of the vehicle based on the determined control information and the determined driver experience level.

* * * * *